(12) United States Patent
Rosenbohm (10) Patent No.: US 12,547,440 B2
(45) Date of Patent: Feb. 10, 2026

(54) PHYSICAL ROUTING APPLIANCE TO CONNECT ENTERPRISE NETWORKS AND CLOUD COMPUTING SERVICES, AND METHOD OF CONNECTION

(71) Applicant: Chad Rosenbohm, Cedar Rapids, IA (US)

(72) Inventor: Chad Rosenbohm, Cedar Rapids, IA (US)

( * ) Notice: Subject to any disclaimer, the term of this patent is extended or adjusted under 35 U.S.C. 154(b) by 435 days.

(21) Appl. No.: 18/205,672

(22) Filed: Jun. 5, 2023

(65) Prior Publication Data

US 2024/0403095 A1     Dec. 5, 2024

(51) Int. Cl.
*G06F 9/455* (2018.01)
(52) U.S. Cl.
CPC .......... *G06F 9/45558* (2013.01); *G06F 2009/45595* (2013.01)
(58) Field of Classification Search
None
See application file for complete search history.

(56) References Cited

U.S. PATENT DOCUMENTS

| | | | | |
|---|---|---|---|---|
| 8,514,868 B2 * | 8/2013 | Hill | ........... | G06F 9/45558 718/1 |
| 8,650,299 B1 * | 2/2014 | Huang | ........... | G06F 9/5077 709/226 |
| 8,705,513 B2 * | 4/2014 | Van Der Merwe | ........... | H04L 47/72 370/392 |
| 8,868,724 B2 * | 10/2014 | Goodwin | ........... | G06F 8/60 709/224 |
| 9,213,718 B1 | 12/2015 | Hrebicek et al. | | |
| 9,391,801 B2 * | 7/2016 | Raghu | ........... | H04L 12/4633 |
| 9,563,637 B2 | 2/2017 | Hrebicek et al. | | |
| 10,019,128 B2 * | 7/2018 | Goodwin | ........... | G06F 3/0481 |
| 10,411,975 B2 | 9/2019 | Martinez et al. | | |
| 11,533,781 B2 | 12/2022 | Bull et al. | | |
| 11,558,245 B1 * | 1/2023 | Kreger-Stickles | ........... | H04L 61/5007 |
| 11,588,683 B2 | 2/2023 | Dumbar et al. | | |

OTHER PUBLICATIONS

Open Compute Project, "Switch Abstraction Interface (SAI)", retrieved from http://opencompute.org, Mar. 28, 2015, 8 pages.
https://en.wikipedia.org/wiki/QUIC, accessed Apr. 17, 2023.

\* cited by examiner

*Primary Examiner* — Van H Nguyen
(74) *Attorney, Agent, or Firm* — BOND, SCHOENECK & KING, PLLC; George R. McGuire (57) ABSTRACT

A physical routing appliance facilitates connection of a user installation to a cloud service. At the physical routing appliance, system data received from the user installation may be multiplexed for transmission to a virtual routing appliance at the cloud service as multiplexed data. At the virtual routing appliance, system data received from the cloud service may be multiplexed for transmission to the physical routing appliance as multiplexed data. The physical routing appliance receives the multiplexed data from the virtual routing appliance and formats that data for transmission to the user installation. The virtual routing appliance in turn receives the multiplexed data from the physical routing appliance and formats that data for transmission to the cloud service. A plurality of paths between the physical routing appliance and the virtual routing appliance enable transmission of the multiplexed data as multiplexed data portions without having to retransmit all of the system data.

20 Claims, 8 Drawing Sheets

PHYSICAL ROUTING APPLIANCE TO CONNECT ENTERPRISE NETWORKS AND CLOUD COMPUTING SERVICES, AND METHOD OF CONNECTION

BACKGROUND OF THE INVENTION

Aspects of the present invention relate to a physical appliance that connects a network to cloud computing services. More specifically, aspects of the invention relate to a Virtual Private Network (VPN) apparatus and system for secure data transport between an outside network system and cloud storage and computing systems.

Prior facilities to configure connections of networks to cloud services have involved substantial numbers of hours of work at significant expense. It would be desirable to reduce the time and expense involved.

SUMMARY OF THE INVENTION

According to embodiments, a switching appliance (referred to herein as a private routing appliance, or PRA) runs software that is configurable into a plurality of multiplexed virtual private networks (VPNs), to facilitate network connection to a virtual routing appliance (VRA) in a cloud service. In one aspect, a communications protocol runs on the switching appliance (sometimes referred to herein as either a switch or an appliance) that can open multiple connections between the network and the cloud service. In one aspect, the invention aggregates links to provide redundancy and higher bandwidth and increase speed.

One way to look at link aggregation is as the combining (aggregating) of multiple network connections in parallel by any of several methods. Link aggregation increases total throughput beyond what a single connection could sustain, and provides redundancy where all but one of the physical links may fail without losing connectivity. A link aggregation group (LAG) is a combined collection of physical ports. In the context of aspects of the present invention, link aggregation may be thought of as a simple description for stacking more than one VPN to distribute or share the connectivity between two points, thus allowing for increased bandwidth and/or stability. No other existing protocol provides this kind of VPN stacking.

In an embodiment, the network may be an enterprise network. According to other embodiments, it is possible to connect cloud services to each other, or to connect one or more cloud services to smaller networks, or data hubs, or even individual computers. For ease of reference in the following description, an embodiment comprising a connection between a network and a cloud service will be referred to.

The inventive communications or network protocol running on a PRA may provide the following benefits, among others:
Automatic establishment of multiple secure communications paths between a network and a cloud service to enable secure multiplexed transmission of data.
Substantial improvement of conversation construction/deconstruction and transmission speed. In one aspect, transforming network communications back to known transport control protocol (TCP)/user datagram protocol (UDP) structures can enable legacy technologies to use the capabilities that aspects of the invention provide, with additional translation or additional overhead.
Combining the insertion of a physical hardware device with an HTTP-based user interface (UI), and with the instantiation, connection, configuration and enablement of a redundant multiplexed VPN tunnel to the CS.
Providing the inventive network protocol without requiring any changes at a CS. In one aspect, the inventive appliance enables the setting up of resources at the CS, but does not require a user installation itself to do anything to set up those resources.
Bandwidth improvement in connections between an enterprise network and a CS using auto-aggregation of redundant multiplexing VPN tunnels. In one aspect, placement of PRAs in close physical proximity (via a single physical cable connection) to the CS can reduce latency and costs while improving performance, bandwidth and connection reliability.
Inclusion of jumbo frames as part of a native capability. This inclusion of jumbo frames may improve transmission rate in a reliable fashion, because the payload of each frame will be larger. There also may be a decrease in mutual transport layer security (mTLS) overhead.
Enablement of domain name system security extensions (DNSSEC) and border gateway protocol (BGP) for dynamic tunnel connections. This enablement of DNSSEC and BGP may improve connectivity, and safety and security of connections.
A service mesh of connectivity across a CS and/or a data center as a software-defined wide area network (SD-WAN).
HTTP/3 connectivity at the appliance level.
Reduction in a number of steps required to set up and tear down a TLS connection from as many as 13 to as few as four. In one aspect, removal of TCP checksum capability may be accomplished while still enabling reliable delivery, without suffering UDP packet and/or frame loss.
Faster retransmission of on-premises data to the CS than is possible with existing technologies, such as TCP over TLS using multiprotocol label switching (MPLS) and BGP.
A cloud service agnostic capability at the protocol level, enabling the PRA to use standard MPLS or internet connections very efficiently. Such an approach can pave the way for future cloud connectivity not as private dedicated connections but rather as standard internet connections that provide sufficient bandwidth for private connectivity over commercial connection paths, for example, public exchange connectivity to public cloud endpoints over private secured tunnels.
Facilitate connection of an enterprise network to any number of cloud service providers. The particular provider is not important. There are a number of hyperscalers, which are large cloud service providers. These include Amazon Web Services (AWS), Azure (from Microsoft), and Google Cloud Provider (GCP), as well as IBM Cloud, Oracle Cloud, Salesforce Cloud, Alibaba Cloud, Tencent Cloud, and others.

In one embodiment, a physical routing apparatus comprises a processor and a non-transitory memory containing instructions which, when implemented by the processor, perform a method comprising:
responsive to connection of the physical routing appliance to a user installation, configuring the physical routing appliance to communicate with a cloud service;
initiating communication between the physical routing appliance and a cloud service to connect the physical routing appliance to the cloud service, including selecting a type of connection between the physical routing appliance and the cloud service;

responsive to connection of the physical routing appliance to the cloud service, determining whether there is a virtual private cloud for the user installation at the cloud service;
determining whether there is a virtual routing appliance for the user installation at the cloud service; and
responsive to a determination that there is a virtual routing appliance for the user installation at the cloud service, initiating a multiplexed virtual private network (VPN) communication path between the physical routing appliance and the virtual routing appliance, wherein communications between the user installation and the cloud service comprise:
at the physical routing appliance:
multiplexing first system data received from the user installation for transmission to the virtual routing appliance as first multiplexed data;
formatting data received from the virtual routing appliance for transmission to the user installation;
at the virtual routing appliance:
multiplexing second system data received from the cloud service for transmission to the physical routing appliance as second multiplexed data;
formatting data received from the physical routing appliance for transmission to the cloud service; and
between the physical routing appliance and the virtual routing appliance:
creating a plurality of paths to transmit the first and second multiplexed data between the physical routing appliance and the virtual routing appliance to enable transmission of the first and second multiplexed data as multiplexed data portions without having to retransmit all of the first and second system data.

In one embodiment, a computer-implemented method comprising, on a processor executing instructions stored in a non-transitory memory comprises:
responsive to connection of the physical routing appliance to a user installation, configuring the physical routing appliance to communicate with a cloud service;
initiating communication between the physical routing appliance and a cloud service to connect the physical routing appliance to the cloud service, including selecting a type of connection between the physical routing appliance and the cloud service;
responsive to connection of the physical routing appliance to the cloud service, determining whether there is a virtual private cloud for the user installation at the cloud service;
determining whether there is a virtual routing appliance for the user installation at the cloud service; and
responsive to a determination that there is a virtual routing appliance for the user installation at the cloud service, initiating a multiplexed virtual private network (VPN) communication path between the physical routing appliance and the virtual routing appliance, wherein communications between the user installation and the cloud service comprise:
at the physical routing appliance:
multiplexing first system data received from the user installation for transmission to the virtual routing appliance as first multiplexed data;
formatting data received from the virtual routing appliance for transmission to the user installation;
at the virtual routing appliance:
multiplexing second system data received from the cloud service for transmission to the physical routing appliance as second multiplexed data;
formatting data received from the physical routing appliance for transmission to the cloud service; and
between the physical routing appliance and the virtual routing appliance:
creating a plurality of paths to transmit the first and second multiplexed data between the physical routing appliance and the virtual routing appliance to enable transmission of the first and second multiplexed data as multiplexed data portions without having to retransmit all of the first and second system data.

BRIEF DESCRIPTION OF THE DRAWINGS

Aspects of the invention now will be described in detail with reference to the accompanying drawings, in which.

DETAILED DESCRIPTION OF EMBODIMENTS

The following description involves a particular embodiment involving connection of a large network, such as an enterprise network, which may be deployed in a number of locations. Ordinarily skilled artisans will appreciate that the invention is not limited to such large networks. In embodiments, an office data center may be connected to a cloud service. In other embodiments, for a given enterprise, a plurality of office data centers may be connected individually to a cloud service. In an embodiment, the plurality of office data centers may be connected centrally within the enterprise, for example, through a hub, and the hub in turn may be connected to the cloud service. In embodiments, individual connections to a cloud service, or cloud to cloud connections are supported.

An embodiment of the invention can enable any user installation to connect to a cloud service. A user installation may be anything from an individual computer, to small networks, to large networks as mentioned previously.

Figure 1:
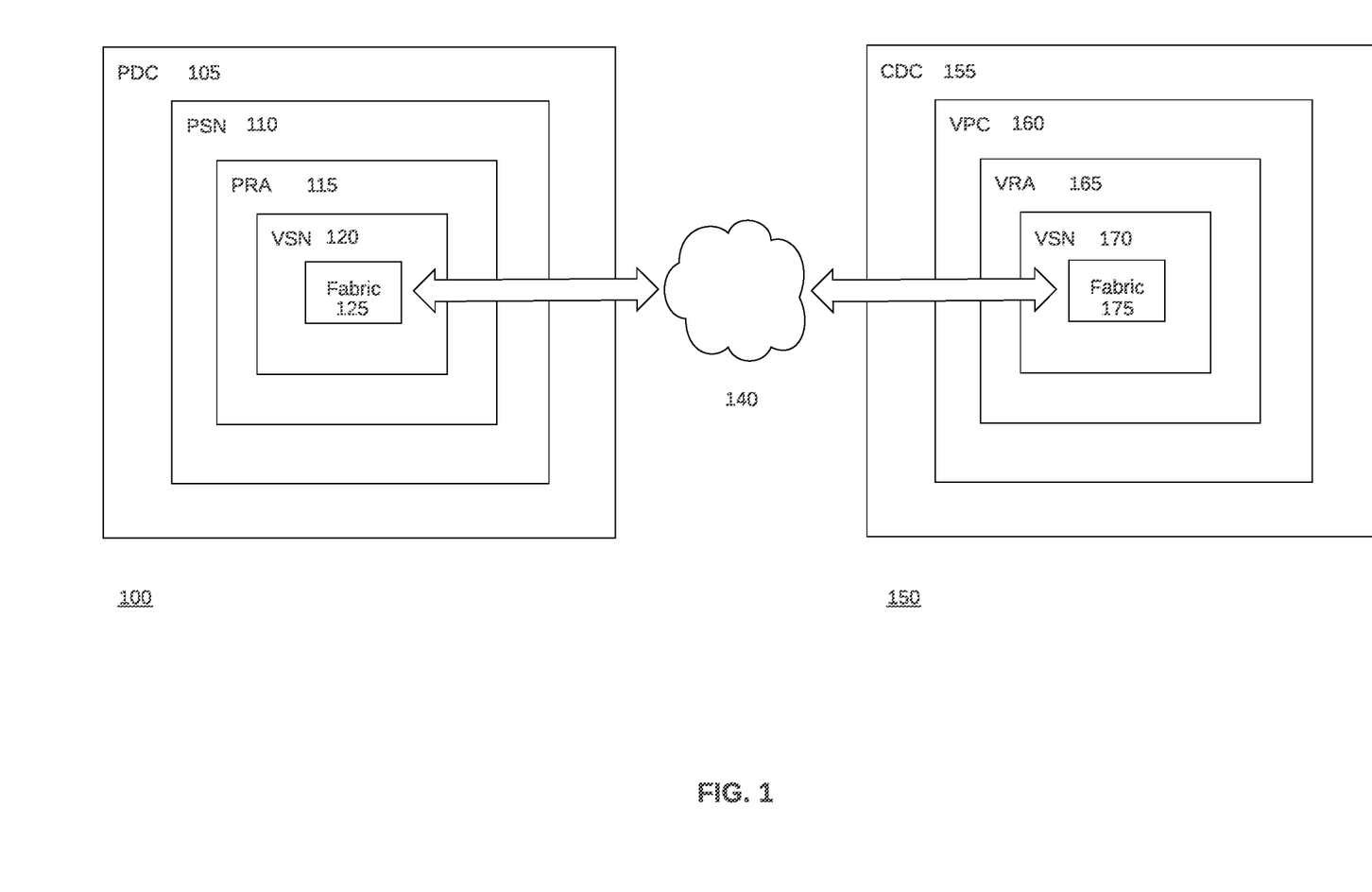
FIG. 1 is a very high level diagram of the enterprise network as connected to a cloud service according to an embodiment.

FIG. 1 shows a conceptualization of an enterprise network 100 and a cloud service 150 in which aspects of the present invention may be implemented according to an embodiment. In FIG. 1, within the enterprise network 100 is a private data center (PDC) 105, at which hardware for the enterprise network, including networking equipment, switches, and the like may be stored. Ordinarily skilled artisans will appreciate that an enterprise network may have multiple PDCs at different locations. Each PDC 105 may have one or more private subnets (PSNs) 110. There may be one physical routing appliance (PRA) 115 for all of the PSNs, though it is within the contemplation of the invention to have a different PRA for each PSN, or each PDC. The PRA 115 creates and operates a virtual subnet (VSN) 120 which facilitates secure network connections to the cloud service via switching fabric 125. In an embodiment, the VSN is a virtual machine, such as a virtual server.

The enterprise network 100 and cloud service 150 connect via communications network 140, which in one aspect may be the internet, or in other aspects may be a shared data center. In an embodiment, aspects of the inventive communications protocol may work with cloud services of many different sizes, including but not limited to hyperscalers.

Within CS 150 are one or more cloud data centers (CDC) 155, which have one or more virtual private clouds (VPC) 160. In an embodiment, a given enterprise network will have its own VPC 160 associated with it. Within VPC 160, a virtual routing appliance (VRA) 165 contains its own VSN 170, which in turn contains communications fabric 175. Fabrics 125 and 175 communicate with each other through the communications network 140.

Within fabrics 125 and 175, according to an embodiment there are mutual authentication facilities (transport layer security, or TLS, in an embodiment mutual TLS, or mTLS) which verify who the parties at either end of a network connection are. In an embodiment, this verification may be accomplished through private key encoding. In an embodiment, each mTLS facility may have its own TLS certificate, in order to provide further security and verification.

Communication between the fabrics 125 and 175 occurs through a network protocol to be described in more detail herein. In one aspect, the network protocol is an enhancement of existing UDP-based protocols to provide greater multiplexing of data to be transmitted over multiple paths between a PRA 115 and a VRA 165. UDP is preferred to TCP in the inventive protocol. because of UDP's lower latency and lack of head-of-line blocking limitations as compared to TCP. In an embodiment, data may be transmitted to and from the PRA 115 within the enterprise or other network via TCP, but may be communicated between the PRA 115 and VRA 165 using the inventive UDP-based protocol. Accordingly, in an embodiment, the inventive communication protocol improves performance by establishing a number of multiplexed connections between two endpoints using UDP rather than TCP, which is a one-to-one protocol.

In an embodiment, the inventive protocol works with HTTP/2's or HTTP/3's multiplexed connections, allowing multiple streams of data to reach all of the endpoints independently. In an embodiment, HTTP/3 may provide greater multiplexing capability. This independent multiple streaming makes each data stream independent of possible packet losses involving other streams. As a result, the inventive protocol avoids the kind of head-of-line blocking delays that TCP can encounter if any TCP packet in a multiplexed stream is delayed or lost. In an embodiment, if a packet is lost, it is sufficient to retransmit only the lost packet, rather than the entire data file from which the packet came. If the receiving entity (in an embodiment, either the PRA 115 or the VRA 165) does not acknowledge receipt of a packet, the communications line responsible for that packet can retransmit it. Alternatively, either the PRA 115 or the VRA 165 can select another communications line over which to retransmit the lost packet.

In an embodiment, a number of multiplexed VPN connections between the PRA 115 and the VRA 165 may be variable, to accommodate different loads to provide the necessary bandwidth. In a sense, the connections may be thought of as burstable because they can be provided in greater or lesser numbers as desired or needed.

In an embodiment, the inventive protocol reduces connection and transport latency. In one aspect, the protocol also avoids congestion by estimating bandwidth requirements and adjusting accordingly. In one aspect, the protocol also moves congestion control algorithms into the user space at both endpoints, rather than moving the algorithms into the kernel space. As a result, it may be possible to enable more rapid improvement of the algorithms. Aspects of the inventive protocol enable the protocol to remain able to evolve. This ability to evolve differentiates the inventive protocol from protocols like TCP, which has suffered significant loss in flexibility, extensibility, and evolvability.

Aspects of the inventive protocol make the exchange of setup keys and supported protocols part of an Initial handshake process. When a client opens a connection, the response packet may include the data needed for future packets to use encryption. This inclusion eliminates the need to set up a TCP connection and then negotiate the security protocol via additional packets. The TCP handshake involves a number of steps. In contrast, in one aspect, the inventive protocol combines multiple handshake steps into a single request-response. This response data can then be used both for following requests in initial setup, as well as for future requests that would otherwise be negotiated as separate connections.

In one aspect, because enterprise networks can grow, mTLS, in combination with the network communication protocol to be described herein and the PRA 115 and VSN 120, facilitates secure rapid scaling to provide point to point connections between enterprise network 100 and CS 150. In one aspect, point to point connection bundles may be considered to be similar to virtual private network (VPN) concentrators, which enable multiple VPN connections to use a single network. In one aspect, the fabrics 125, 175 may employ a VPN tunnel for further security between PRA 115 and VRA 165. In an embodiment, the multiplexed connections that are established between PRA 115 and VRA 165 are a multiplexed VPN tunnel.

VPNs can impose a chipset limitation on the appliance because of the complexity of generating the encryption keys. This complexity can require a specific chip in order to speed up the connection. Depending on the embodiment, such a specific chip may be used in the appliance. Alternatively, lighter load dependencies may be employed, to account for the number of encryption/decryption actions required to create and validate the connection.

Figure 2A:
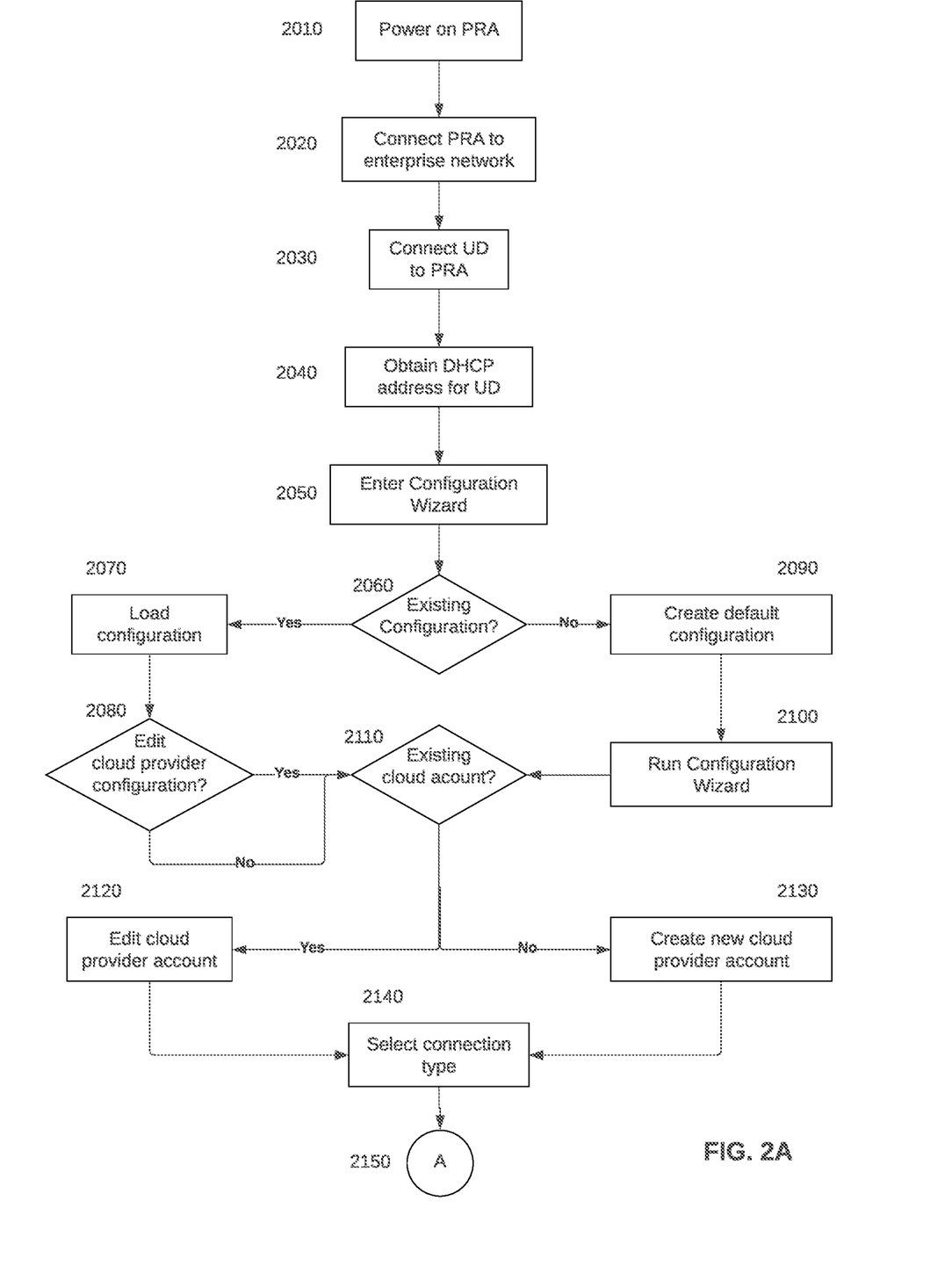
FIGS. 2A and 2B are a high level flow chart depicting a sequence of connecting an enterprise network to a cloud service using a switching appliance according to an embodiment.
Figure 2B:
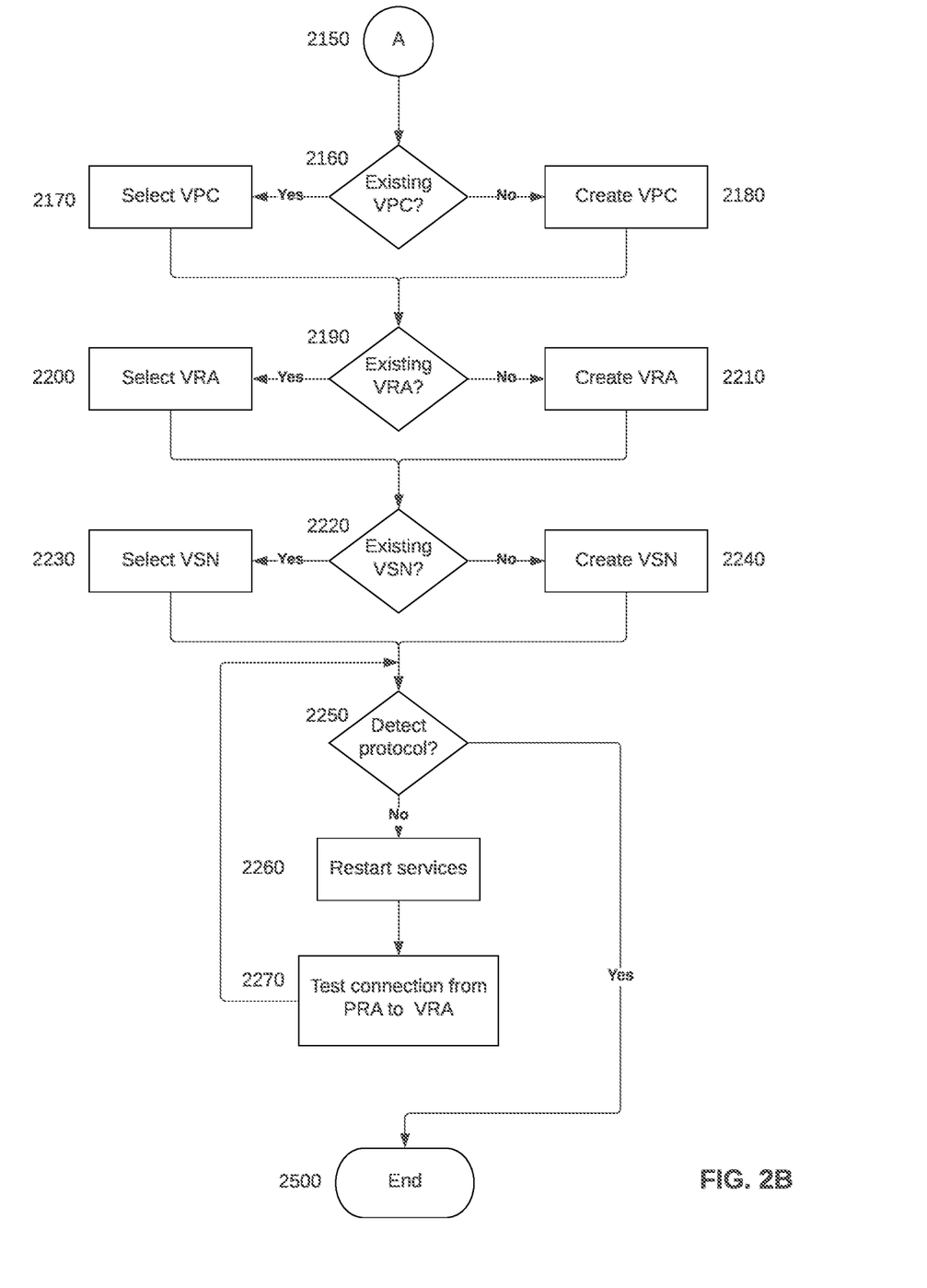

FIGS. 2A and 2B are a flow chart depicting aspects of operation of PRA 115 to create necessary resources and connections for the setup of a client to server tunnel protocol from PDC 105 to CDC 155. At 2010, the PRA 115 may be powered on. At 2020, the PRA 115 may be connected to the enterprise network 100. At 2030, a user device (UD) which is to access CS 150 may be connected to an available port PRA 115. At 2040, a DHCP address may be obtained for the UD. At 2050, the UD may be presented with a configuration or setup wizard running on PRA 115.

At 2060, a first action of the setup wizard may be to determine whether the UD already has an existing configuration. If it does, then at 2070 the PRA 115 loads that configuration into the UD. If editing is to be done, that occurs at 2080. If the UD does not already have an existing configuration, then at 2090 a default configuration may be created, and the configuration wizard run on the default configuration to configure the UD appropriately.

After the configuration wizard finishes, at 2110 it is determined whether the CS to which the UD seeks access is a CS for which there is an existing account. If so, then at

2120 any necessary or desired edits to the CS account may be made. If there is no existing account, then at 2130 a new CS account may be created. In an embodiment, software running on PRA 115 may open a site at a CS of choice to enable a user to create a new account for the enterprise network to be connected to the CS. The software also may request the appropriate account permissions (for example, user ID and any necessary secret key), so that the CS may create the account and provide the necessary resources. In an embodiment, the CS may create the VPC and upload a VRA for the enterprise network. Whether there is an existing VRA or a VRA is created, a VRA is necessary in order to be able to handle the data to be received from PRA 115 using the inventive communications protocol, and to put data from CDC 155 in appropriate format for transmission to PRA 115 using the inventive communications protocol, in a manner to be described. Once the account is created, one or more keys may be set up to facilitate secure communication between enterprise network 100 and CS 150 over communications network 140.

After appropriate creation, selection, and/or editing of the account for the enterprise network, in an embodiment, at 2140 a connection type may be selected. Depending on the embodiment, different connection types such as a VPN, a scalable zero trust protocol (ZPA), or a direct connection may be established. In one aspect, ZPA's scalability enables additional resources on the enterprise network to connect to the CS. Once the connection type is done, flow continues via 2150 to FIG. 2B. At 2160, a determination is made whether there is an existing VPC for the enterprise network at the CS. If so, then at 2170 that VPC is selected. If not, then at 2180 a new VPC is created, using keys created for the enterprise network.

At 2190, a determination is made whether there is an existing VRA for the enterprise network at the CS. If there is, then at 2200 that VRA is selected. If not, then at 2210 a new VRA is created. In an embodiment, software running on the PRA 115 may create new keys, and may deploy the new VRA. At 2220, a determination is made whether there is an existing VSN for the enterprise network at the CS. If there is, then at 2230 that VSN is selected. If not, then at 2240 a new VSN is created.

At 2250, a determination is made whether the inventive communication protocol is detected. In one aspect, the determination involves connection of network flow and enablement of security between the PRA 115 and the VRA 165. If the protocol is detected, the setup process ends. If the protocol is not detected, at 2260 network resources and other services may be restarted. Once the restart is finished, at 2270 a connection between the PRA 115 and the VRA 165 may be tested. The restarting and testing will repeat until the protocol is detected, at which point the setup process will end.

Figure 3A:
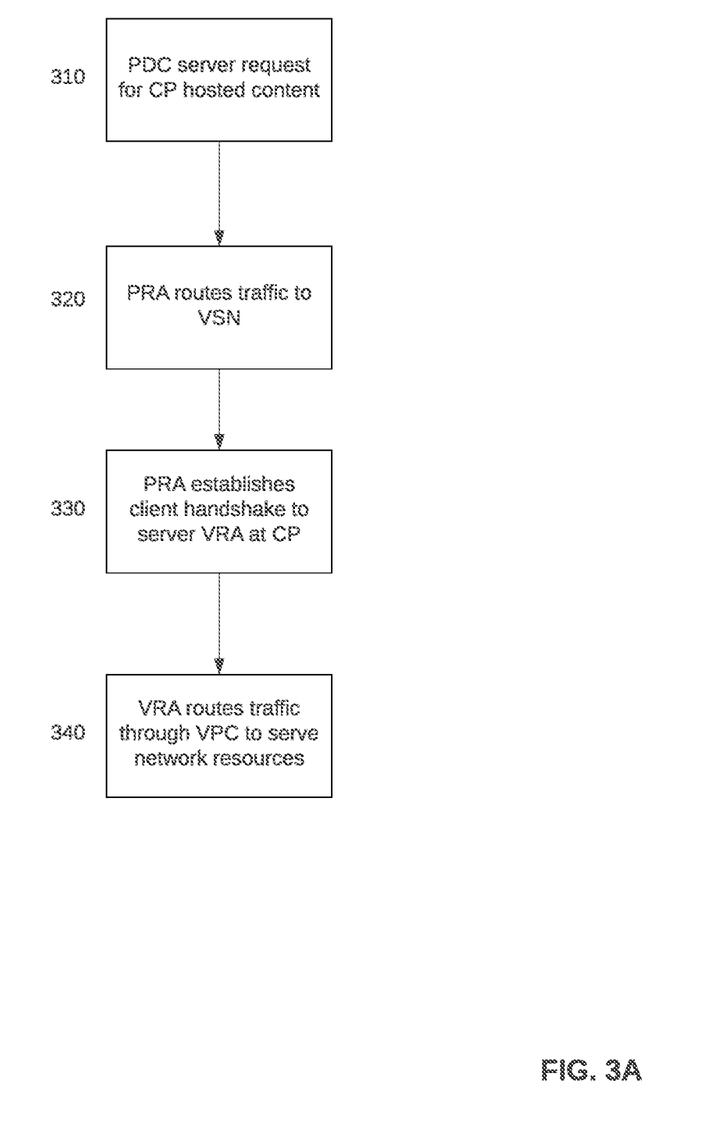
FIG. 3A is a high level flow chart depicting aspects of data flow from an enterprise network to a cloud service according to an embodiment.

FIG. 3A is a flow chart depicting aspects of resource management for PRA 115, which in an embodiment may act as a client for the inventive communications protocol to connect to VRA 165, essentially creating a VPN tunneling protocol.

At 310, a PDC 105 may originate a server request for content hosted at a CS 150. In an embodiment, logic may be provided to determine network routes through PRA 115. In one aspect, a VPN may be employed to create BGP forwarded routes. At 320, the PRA 115 routes traffic to VSN 170 at CS 150. In one aspect, the routing may be done using any routes from the enterprise network to the cloud provider. In a further aspect, these routes may include private IP addresses at the CP 150. In an embodiment, PRA 115 handles the various connections and handoffs using the inventive network protocol.

At 330, the PRA 115 establishes the necessary communications handshake between the VSN 120 in enterprise network 100, and VSN 170 in CS 150. At 340, the VRA 165 routes through the VPC 160 to serve network resources.

Figure 3B:
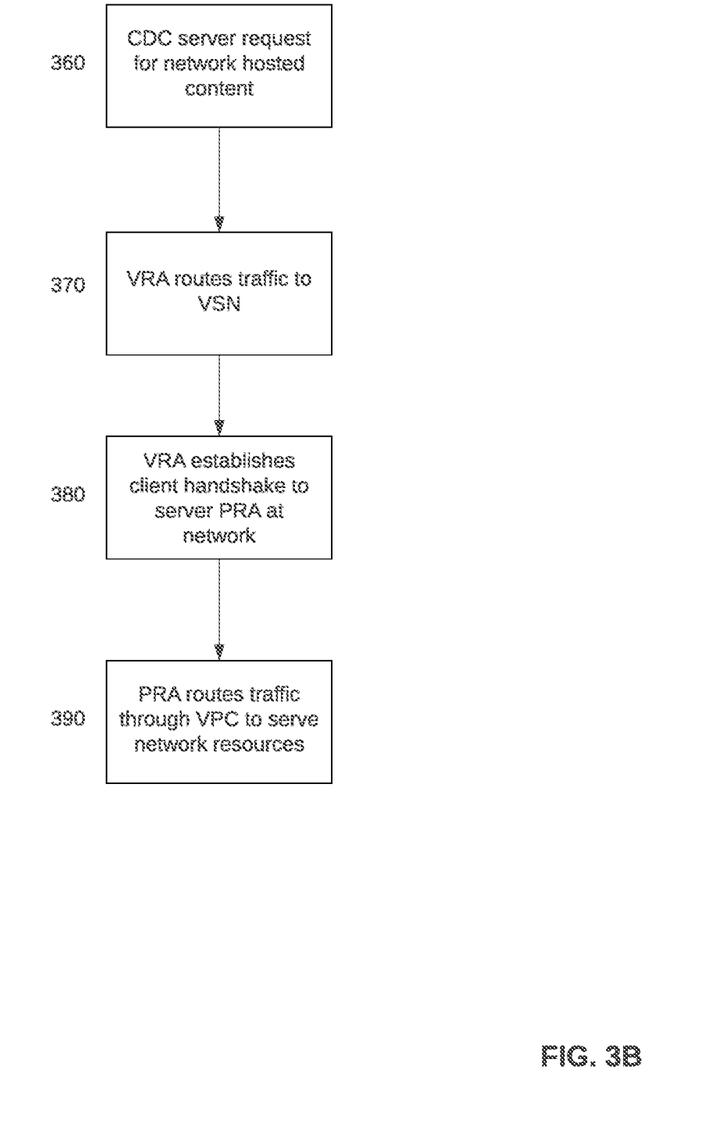
FIG. 3B is a high level flow chart depicting aspects of data flow from a cloud service to an enterprise network according to an embodiment.

FIG. 3B is a flow chart depicting aspects of resource management for VRA 165, which in an embodiment may act as a client for the inventive communications protocol to connect to the PRA 115, essentially creating the VPN tunneling protocol referred to earlier.

At 360, a CDC 155 may originate a server request for content hosted within an enterprise 100. In an embodiment, logic may be provided to determine network routes through VRA 165. In one aspect, a VPN may be employed to create BGP forwarded routes. At 370, the VRA 165 routes traffic to VSN 120 at the enterprise network 100. In one aspect, the routing may be done using any routes from the cloud service to the enterprise network 100. In a further aspect, these routes may include private IP addresses at the enterprise network 100. In an embodiment, VRA 165 handles the various connections and handoffs using the inventive network protocol.

At 380, the VRA 165 establishes the necessary communications handshake between the VSN 170 in CS 150, and VSN 120 in enterprise network 100. At 390, the PRA 115 routes through the PSN 110 to serve network resources.

Looking more closely at the operation of the PRA 115 and VRA 165, it may be understood that, in an embodiment, connections between the PRA and VRA are a plurality of lines through which data may be exchanged between a network and a cloud service. A file to be sent is divided at the source (PRA or VRA) into a plurality of pieces, each piece traveling over one of the lines, and reassembled at the intended destination (VRA or PRA) for the file. Each line is associated with the file piece which it is responsible to send. In the event that any of the pieces does not reach its destination, the line charged with sending that piece may resend it, without holding up transmission of any of the other pieces.

Figure 4:
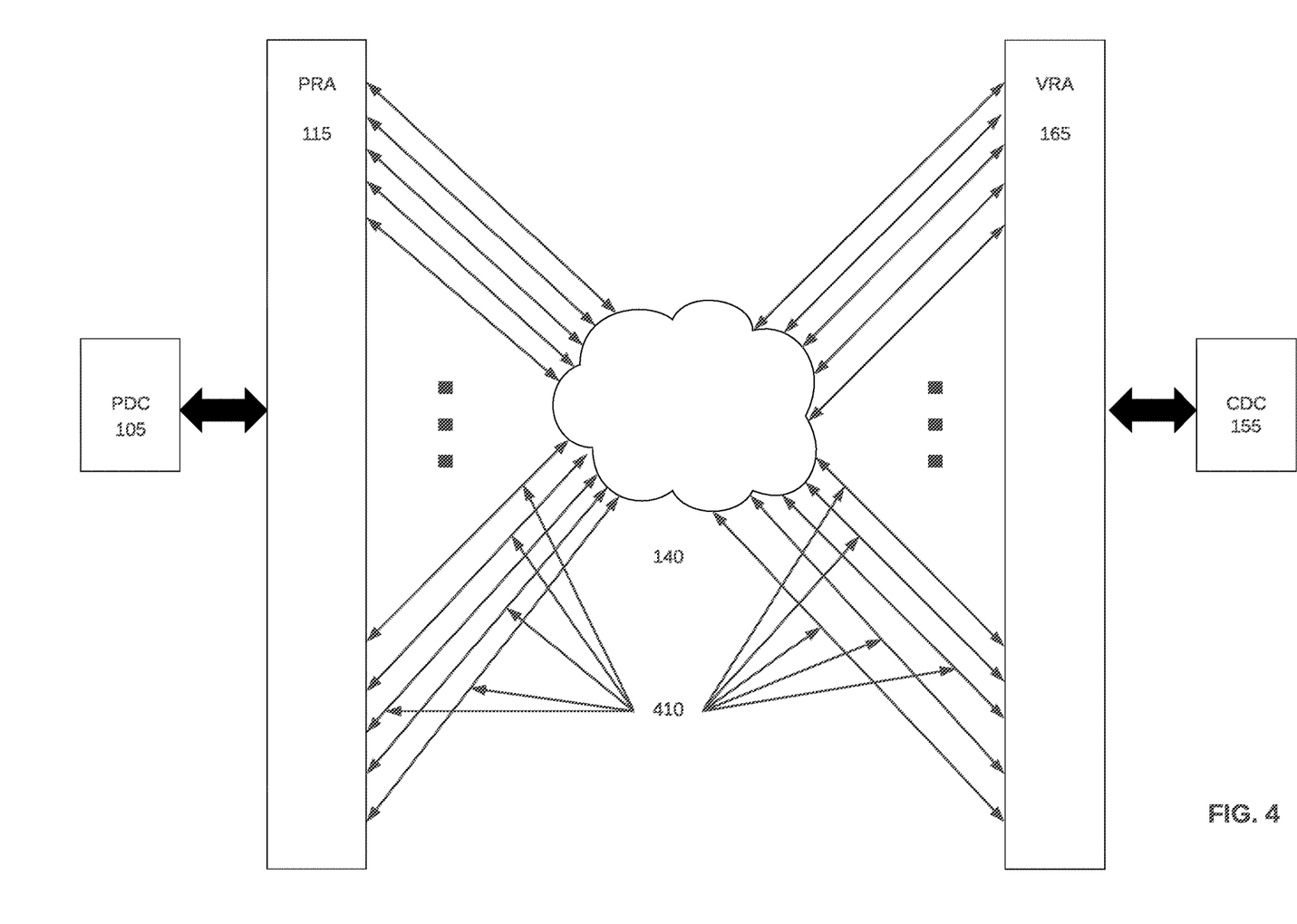
FIG. 4 is a high-level diagram depicting the transmission of data between a PRA to a VRA according to an embodiment.

In FIG. 4, a PRA 115 receives data from PDC 105 (VSN 110). Data transmitted between PDC 105 and PRA 115 may be over any suitable communications protocol, including TCP. The PRA 115 may receive the data from PDC 105 in a number of formats, including the jumbo frames referred to earlier. In an embodiment, PRA 115 may place the data received from PDC 105 into jumbo frames to expedite transmission to the VRA 165 in CS 150. PRA 115 splits the data received from PDC 105 into a plurality of pieces, and transmits those pieces over a plurality of communications lines 410 to VRA 165 through the communications network 140. When VRA 165 receives data from PRA 115 in the plurality of pieces over communications lines 410, VRA 165 reformats the pieces into the original files and sends the files on to the CDC 155. Communication between VRA 165 and CDC 155 (VPC 160) may be over any suitable communications protocol, including TCP.

In similar fashion, VRA 165 receives data from CDC 155 (VPC 160). The VRA 115 may receive the data from PDC 105 in a number of formats, including the jumbo frames referred to earlier. VRA 165 may place the data received from CDC 155 into jumbo frames to expedite transmission to the PRA 115 in enterprise network 100. VRA 165 splits the data received from CDC 155 into a plurality of pieces, and transmits those pieces over the plurality of communications lines 410 to PRA 115 through the communications network 140. When the PRA 115 receives data from VRA 165 in the plurality of pieces over communications lines 410, PRA 115 reformats the pieces into the original files and sends the files on to the PDC 105.

From the foregoing description of FIG. 4, ordinarily skilled artisans will appreciate the inventive communications protocol is provided between PRA 115 and VRA 165 according to embodiments, but need not be used elsewhere within either enterprise network 100 or cloud service 150. Consequently, data within enterprise network 100 or cloud service 150 may be handled in a conventional manner, without need for the inventive communications protocol.

In an embodiment, by breaking data files into pieces for transmission between PRA 115 and VRA 165, bandwidth may be improved in at least two ways. First, data files may be sent in parallel rather than in series. Second, if any data piece is lost in transmission, only that piece needs to be retransmitted, rather than the entire file to which the data piece belongs. To accomplish the partial retransmission just described, in an embodiment both PRA 115 and VRA 165 keep track of what data pieces are being sent over the various communications lines 410. Accordingly, if a particular communications line 410 fails, the data piece associated with that failed communications line may be sent over another communications line. Alternatively, a retry may be attempted over the failed communications line, in the event for example that the failed communications line is down only temporarily, or until another communications line is available over which to transmit the data piece.

As mentioned earlier, one aspect of the fabric 125, 175 over which data is transmitted between PRA 115 and VRA 165 is the security resulting from the keys exchanged upon establishment of communications.

Figure 5A:
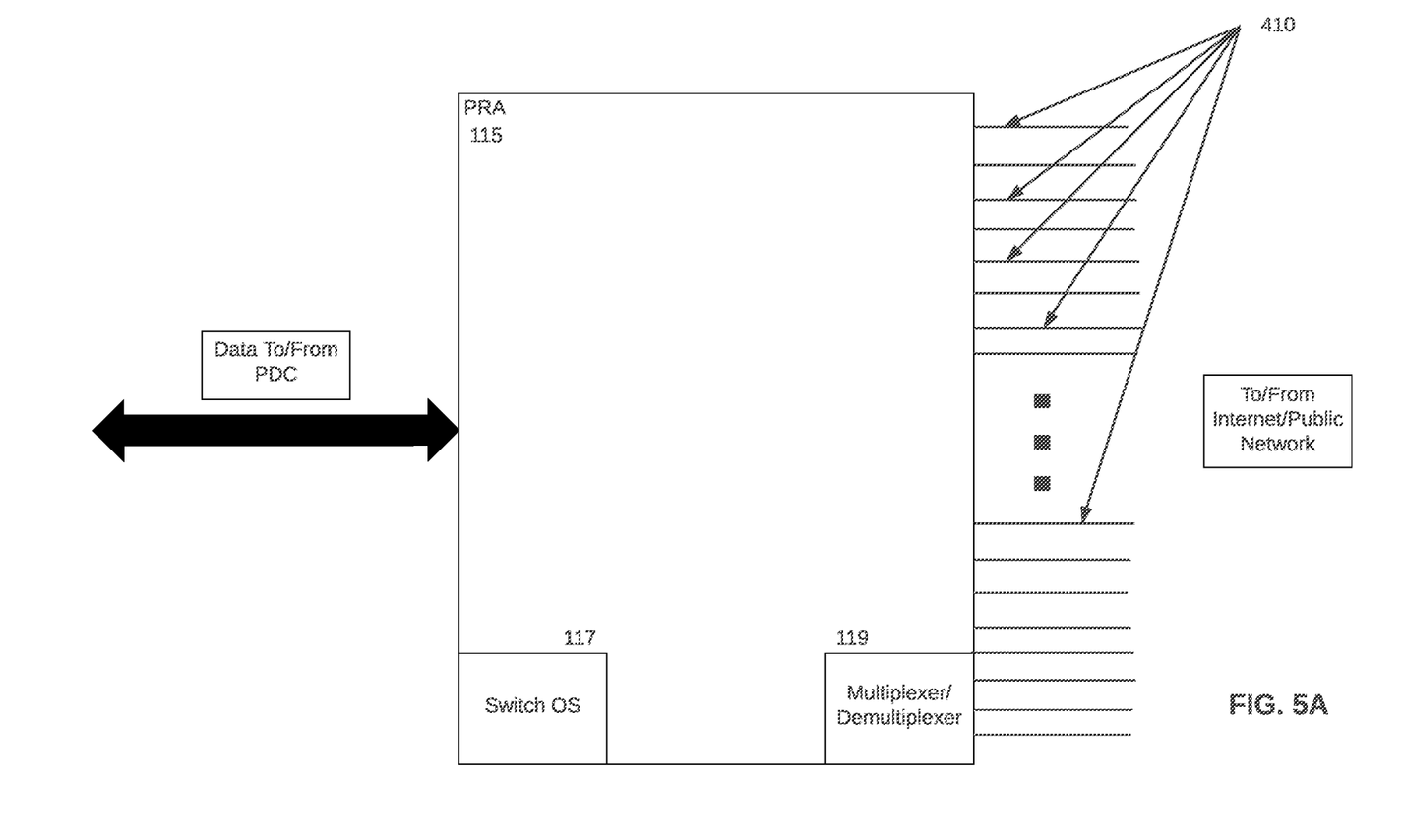
FIG. 5A is a high-level diagram depicting contents of a PRA.
Figure 5B:
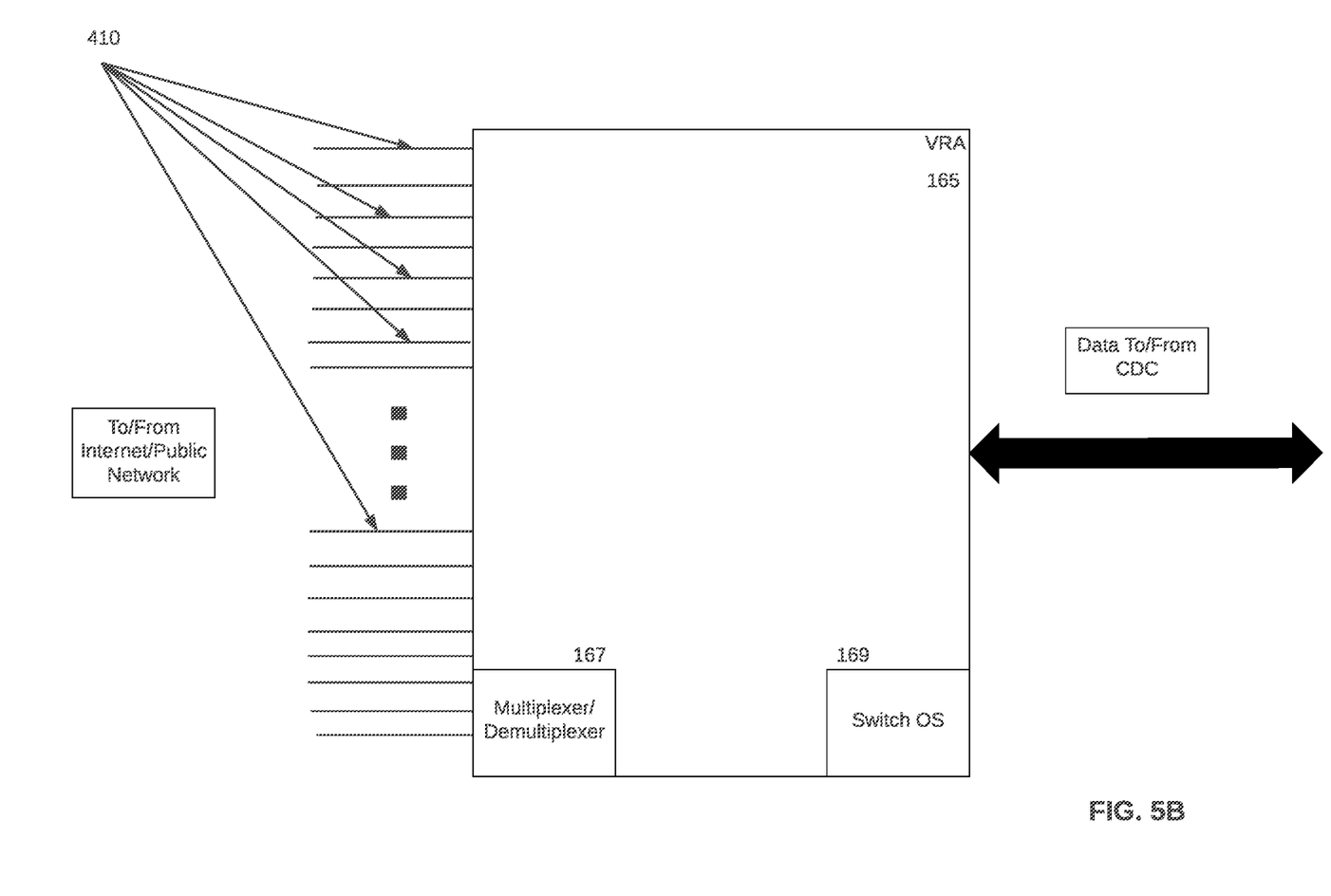
FIG. 5B is a high-level diagram depicting contents of a VRA.

FIGS. 5A and 5B depict high level functionality within PRA 115 and VRA 165 to facilitate data transmission using the inventive communications protocol according to an embodiment. In FIG. 5A, similarly to FIG. 4, PRA 115 communicates data to and from PDC 105, and communications data to and from VRA 165 over communications lines 410. Within PRA 115, switch OS 117 establishes the necessary communications lines 410 to facilitate transmission of data to/from VRA 165. Multiplexer/demultiplexer 119, which in an embodiment may be part of switch OS 117, puts data from PDC 105 in suitable format for transfer over communications lines 410 to VRA 165, and takes multiplexed data from VRA 165, demultiplexes the data, and reconstitutes the data in its original form at VPC 160 for transfer to PDC 105.

In FIG. 5B, within VRA 165, switch OS 167 establishes the necessary communications lines 410 to facilitate transmission of data to/from PRA 115. Multiplexer/demultiplexer 169, which in an embodiment may be part of switch OS 167, puts data from CDC 155 in suitable format for transfer over communications lines 410 to PRA 115, and takes multiplexed data from PRA 115, demultiplexes the data, and reconstitutes the data in its original form at PDC 105 for transfer to CDC 155.

In the foregoing, ordinarily skilled artisans will appreciate that, in an embodiment, only PRA 115 need be a physical appliance, while VRA 165 need not be a physical appliance. PRA 115 may have the capability to establish and enable VRA 165 and thus establish the numerous communications lines to effect the desired multiplexed communications between PRA 115 and VRA 165.

In an embodiment, the PDC 105 may be in the same physical location as cloud service 150. In that event, PRA 115 may communicate with VRA 165 in the same fashion as if PDC were located remotely from the cloud service.

In an embodiment, where there are multiple enterprise networks to be connected to a cloud service, it may be that the enterprise has a single PRA connected to all of the enterprise networks, and that the single PRA connects to a VRA at CDC 155. Alternatively, each enterprise network may have a PRA associated with it. Those PRAs may communicate with a single VRA at cloud CDC 155, or may each communicate with a different VRA.

While the invention has been described in detail with reference to embodiments, ordinarily skilled artisans will appreciate that variations within the scope and spirit of the invention are possible. Accordingly, the invention is to be construed as limited only by the scope of the following claims.

What is claimed is:

1. A physical routing appliance comprising:
a processor; and
a non-transitory memory storing instructions which, when executed by the processor, perform the following:
responsive to connection of the physical routing appliance to a user installation, configuring the physical routing appliance to communicate with a cloud service;
initiating communication between the physical routing appliance and a cloud service to connect the physical routing appliance to the cloud service, including selecting a type of connection between the physical routing appliance and the cloud service;
responsive to connection of the physical routing appliance to the cloud service, determining whether there is a virtual private cloud for the user installation at the cloud service;
determining whether there is a virtual routing appliance for the user installation at the cloud service; and
responsive to a determination that there is a virtual routing appliance for the user installation at the cloud service, initiating a multiplexed virtual private network (VPN) communication path between the physical routing appliance and the virtual routing appliance, wherein communications between the user installation and the cloud service comprise:
at the physical routing appliance, multiplexing first system data received from the user installation for transmission to the virtual routing appliance as first multiplexed data;
at the virtual routing appliance, multiplexing second system data received from the cloud service for transmission to the physical routing appliance as second multiplexed data;
receiving the second multiplexed data from the virtual routing appliance and demultiplexing the second multiplexed data for transmission to the user installation;
receiving the first multiplexed data from the physical routing appliance and demultiplexing the second multiplexed data for transmission to the cloud service; and
creating a plurality of paths to transmit the first and second multiplexed data between the physical routing appliance and the virtual routing appliance to enable transmission of the first and second multiplexed data as multiplexed data portions without having to retransmit all of the first and second system data.

2. The appliance of claim 1, wherein multiplexing the first system data and multiplexing the second system data comprises, at the respective physical routing appliance and virtual routing appliance, deconstructing data received from the respective user installation and cloud service into the multiplexed data portions which are transmitted over the plurality of paths.

3. The appliance of claim 1, wherein the user installation is selected from the group consisting of a user device, a plurality of networked user devices, an enterprise network, and a plurality of enterprise networks.

4. The appliance of claim 1, wherein the type of connection between the physical routing appliance and the cloud service is selected from the group consisting of a virtual private network (VPN), a scalable zero trust protocol (ZPA), and a direct connection.

5. The appliance of claim 4, wherein the direct connection comprises a connection through a public communications network.

6. The appliance of claim 1, wherein the configuring comprises editing an existing profile for the physical routing appliance.

7. The appliance of claim 1, wherein the configuring comprises creating a new profile for the physical routing appliance.

8. The appliance of claim 1, wherein the processor further performs the following:
responsive to a determination that there is no virtual private cloud for the user installation at the cloud service, creating the virtual private cloud.

9. The appliance of claim 1, wherein the processor further performs the following:
responsive to a determination that there is no virtual routing appliance for the user installation at the cloud service, creating a virtual routing appliance.

10. The appliance of claim 1, further comprising a switch fabric for transmitting the multiplexed data portions.

11. A computer-implemented method comprising, on a processor executing instructions stored in a non-transitory memory:
responsive to connection of the physical routing appliance to a user installation, configuring the physical routing appliance to communicate with a cloud service;
initiating communication between the physical routing appliance and a cloud service to connect the physical routing appliance to the cloud service, including selecting a type of connection between the physical routing appliance and the cloud service;
responsive to connection of the physical routing appliance to the cloud service, determining whether there is a virtual private cloud for the user installation at the cloud service;
determining whether there is a virtual routing appliance for the user installation at the cloud service; and
responsive to a determination that there is a virtual routing appliance for the user installation at the cloud service, initiating a multiplexed virtual private network (VPN) communication path between the physical routing appliance and the virtual routing appliance, wherein communications between the user installation and the cloud service comprise:
at the physical routing appliance:
multiplexing first system data received from the user installation for transmission to the virtual routing appliance as first multiplexed data;
formatting data received from the virtual routing appliance for transmission to the user installation;
at the virtual routing appliance:
multiplexing second system data received from the cloud service for transmission to the physical routing appliance as second multiplexed data;
formatting data received from the physical routing appliance for transmission to the cloud service; and
between the physical routing appliance and the virtual routing appliance:
creating a plurality of paths to transmit the first and second multiplexed data between the physical routing appliance and the virtual routing appliance to enable transmission of the first and second multiplexed data as multiplexed data portions without having to retransmit all of the first and second system data.

12. The computer-implemented method of claim 11, wherein multiplexing the first system data and multiplexing the second system data comprises, at the respective physical routing appliance and virtual routing appliance, deconstructing data received from the respective user installation and cloud service into the multiplexed data portions which are transmitted over the plurality of paths.

13. The computer-implemented method of claim 11, wherein the user installation is selected from the group consisting of a user device, a plurality of networked user devices, an enterprise network, and a plurality of enterprise networks.

14. The computer-implemented method of claim 11, wherein the type of connection between the physical routing appliance and the cloud service is selected from the group consisting of a virtual private network (VPN), a scalable zero trust protocol (ZPA), and a direct connection.

15. The computer-implemented method of claim 14, wherein the direct connection comprises a connection through a public communications network.

16. The computer-implemented method of claim 11, wherein the configuring comprises editing an existing profile for the physical routing appliance.

17. The computer-implemented method of claim 11, wherein the configuring comprises creating a new profile for the physical routing appliance.

18. The computer-implemented method of claim 11, further comprising:
responsive to a determination that there is no virtual private cloud for the user installation at the cloud service, creating the virtual private cloud.

19. The computer-implemented method of claim 11, further comprising:
responsive to a determination that there is no virtual routing appliance for the user installation at the cloud service, creating a virtual routing appliance.

20. The computer-implemented method of claim 11, further comprising providing a switch fabric for transmitting the multiplexed data portions.

\* \* \* \* \*